Feb. 13, 1923.
J. C. BOHMKER
1,445,265
SPREADER
Filed June 23, 1920 2 sheets-sheet 1
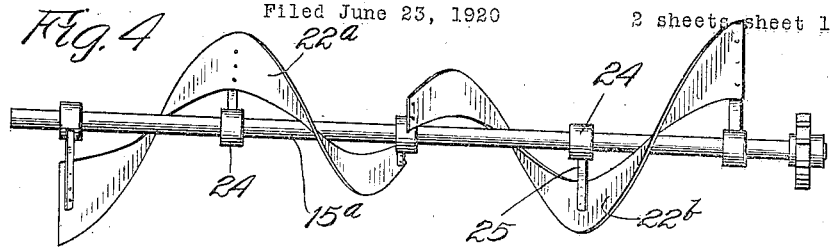
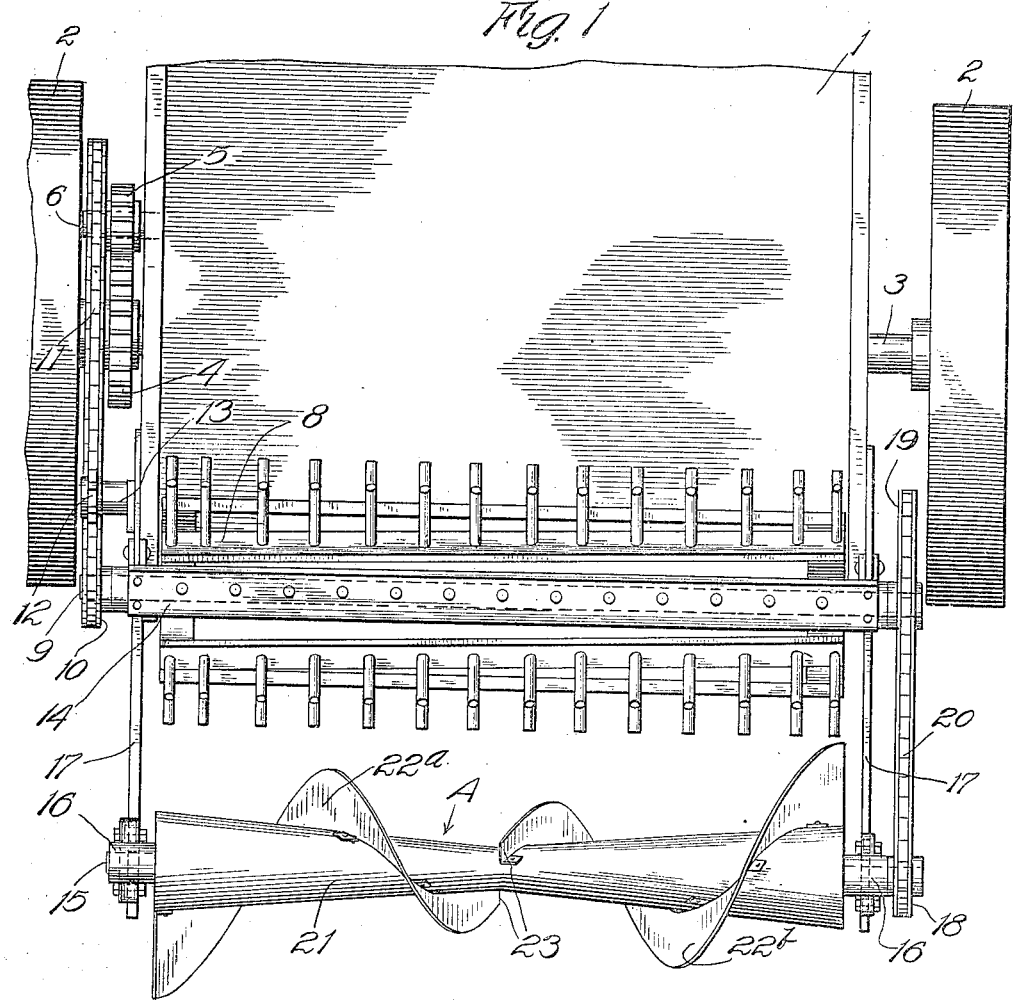
Inventor
John C. Bohmker
By Miller Chindahl Parker
Attys

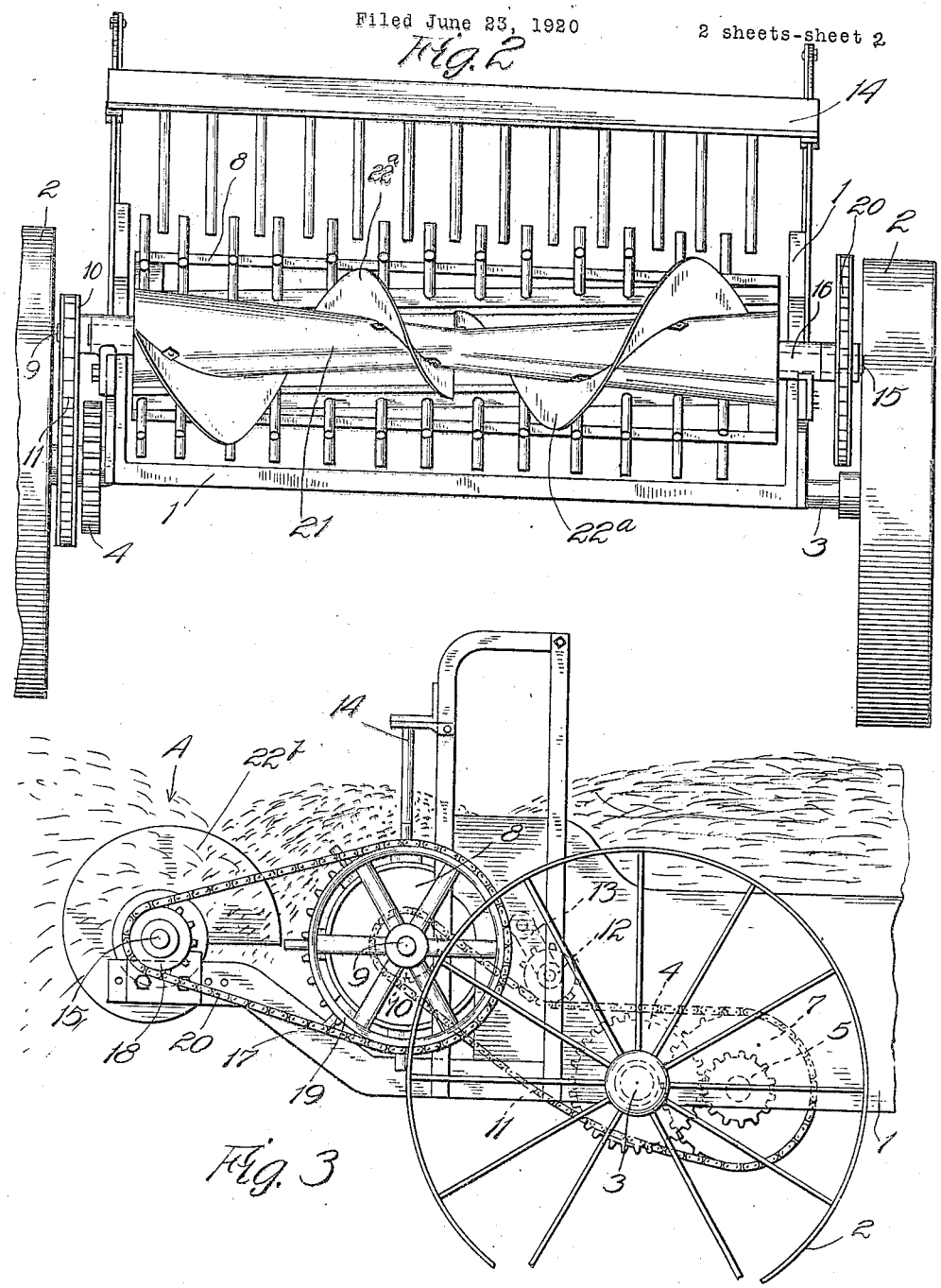

Patented Feb. 13, 1923.

1,445,265

UNITED STATES PATENT OFFICE.

JOHN C. BOHMKER, OF KANKAKEE, ILLINOIS, ASSIGNOR TO SEARS, ROEBUCK AND CO., OF CHICAGO, ILLINOIS, A CORPORATION OF NEW YORK.

SPREADER.

Application filed June 23, 1920. Serial No. 391,177.

*To all whom it may concern:*

Be it known that I, JOHN C. BOHMKER, a citizen of the United States, residing at Kankakee, in the county of Kankakee and State of Illinois, have invented certain new and useful Improvement in Spreaders, of which the following is a specification.

The invention relates to machines for spreading manure or other fertilizer material, and has particular reference to widespread distributing mechanisms therefor.

The object of the invention primarily is to provide means for distributing fertilizer over a wide swath and accomplish the distribution evenly throughout its width.

Another object is to permit utilizing the full capacity of a manure spreader by filling it with a "crowned" load without sacrificing uniformity of spread because of the greater quantity of material discharged from the center of a machine so loaded.

Another object is to break up thoroughly the masses of material which may be delivered by the discharging apparatus before its deposit upon the soil.

A further object is to provide a simply constructed durable mechanism which will operate efficiently and withstand the severe usage to which such devices are subjected.

Further objects and advantages will be apparent in the following description of a preferred embodiment of my invention, which is illustrated in the accompanying drawings.

Figure 1 of the drawings represents in plan view the rear portion of a manure spreader including the discharging apparatus and its driving means, and my device mounted in connection therewith. Fig. 2 is a rear end view of the same mechanism. Fig. 3 is a side elevation, and illustrates the action of the fertilizer material during operation of the device. Fig. 4 represent the device constructed without the core shown in Figs. 1 to 3.

The reference numeral 1 indicates the body of the manure spreader which may be equipped with one of the well known devices (not illustrated herein) adapted to propel the load rearwardly for discharge. Rear wheels 2 are suitably mounted on a driving axle 3 which is journaled upon the body 1. A spur gear 4 carried upon the driving axle has driving engagement with a pinion 5 mounted upon a stub axle 6 supported upon the body. A sprocket wheel 7 having fixed relation to the pinion 5 is mounted on the stub axle 6. At the rear end of the body, a beater cylinder 8 for discharging the load is rotatably supported thereon, having a shaft 9 carrying at one end a sprocket 10. The sprocket 10 is driven from the sprocket 7 by means of the drive chain 11. An idler sprocket 12 is mounted upon a swinging bracket 13 attached to the body 1, and is adapted to adjust the tension of the drive chain. Above the beater cylinder a rake 14 is suitably supported upon the body 1.

As the foregoing devices are all well known it will not be necessary to describe them more minutely.

The wide spread distributing mechanism is indicated in its entirety at A. The device is mounted upon a shaft 15, which is journaled in bearings 16 adjustably mounted upon a pair of supporting brackets 17 suitably attached to the body of the machine. The shaft 15 is positioned to the rearward and parallel to the shaft 9 of the beater cylinder. A sprocket 18 is rigidly mounted on the end of the shaft 15 which is driven from a sprocket 19 mounted on the shaft 9, by a drive chain 20. The sprocket 18 is proportioned in size to the sprocket 19 in such relation that the wide spread device is revolved at considerably higher speed than the beater cylinder. A core 21 preferably is mounted on the shaft 15 having its axis coincident with the axis of the shaft, and adapted to rotate therewith.

In the present embodiment illustrated in Fig. 1 I have shown the core to be formed as of a pair of truncated cones of equal dimensions, with their smaller ends abutting at the center of the core. The core may be constructed with any varied relation of diameters between its ends which the type of spreader and the desired direction of delivery may require.

Spiral elements 22$^a$ and 22$^b$ are attached to the core 21, and form blades varying in width from end to end and mounted with an increasing pitch from the center to the ends of the core. In my preferred embodiment the blades are positioned with their narrow ends diametrically opposed at the center of the core, as at 23, and extending outwardly upon a progressively increasing pitch line and with an increasing width of blade to the ends of the core. It is apparent that the peripheries of the revolving blades will define a surface of revolution having varying diameters.

The core 21 is constructed to fill the space within the inner edges of the spiral blades, and thus to provide a base upon which the material from the beater is received in position for the most effective action by the blades. It also prevents the clogging of material within the blades. Its increasing diameter results in increasing the effect of centrifugal action upon the material falling between the revolving blades by reason of the greater surface speed of the core at its larger cross sections.

The spiral blades $22^a$ and $22^b$, operating at high speed, serve to pulverize the fertilizer and distribute it over the soil. The increasing width of the blades gives correspondingly increasing diameter to the surface described by their revolution and thereby their centrifugal action in scattering the material is increased. The latter result is also accomplished in greater degree by the increasing pitch of the blades. At the center of the device the action of the blades includes a distinct slicing effect which tends to propel the material laterally, and as the pitch increases toward the ends of the device, the surfaces of the blades approach the perpendicular to the direction of the material coming from the beater and consequently the material is thrown from the blades with greater force.

It is well known that in the operation of a manure spreader filled to capacity with a "crowned" load, and equipped for the discharge of the material with a beater cylinder only, the spread will be a narrow swath unevenly distributed, the greater quantity being deposited at the center. The adaptation to manure spreaders of auxiliary distributers of the type having spiral blades of uniform width mounted upon a rapidly revolving cylinder upon which is cast the material discharged from the load by the discharging cylinder accomplishes an increased width of spread, but has not given satisfactory results in uniformity of spread.

In my device, having a core and blades formed in the manner illustrated, it will be apparent that the greater volume of material discharged from the center portion of the load as cast over by the beater cylinder is received upon the center portion of the revolving distributer, whereat the core is of least diameter, the blades are of least width, and the spiral pitch of the blades approach nearest to a diametrical plane.

The result of my arrangement of the core and blades is that where the greatest quantity of material is received upon the blades, the laterally propelling action of the blades is in greatest proportion to their centrifugal action in expelling the material. The proportionate effect of centrifugal force increases progressively toward the ends of the distributer by reason of the increasing diameter of the core and the increasing width and pitch of the blades. By this means I have provided for the lateral displacement of the excess quantity of material discharged from the center of the load to supply the deficiency in the discharge from the sides of the load to the degree necessary to deposit a uniform amount of material over the full width of the swath covered by the distributer.

The rapidly revolving spiral blades also accomplish the complete disintegration of any mass of fertilizer which is thrown over without being broken up by the beater cylinder, and in that result further assure an even distribution of the material.

In the illustration given herein I have shown the distributer as designed to deposit a swath of fertilizer somewhat wider than the wheel tread of the manure spreader, and extending beyond both sides thereof. If it be desired to distribute the material in a swath extending to one side only, the device may be arranged to accomplish that result by constructing the blades with the proper relation of width and pitch required for uniform distribution in one lateral direction of the excess quantity discharged from the center. Likewise, by varying the proportionate dimensions and pitch of the core and blades, my device may be adapted to any of the various sizes and designs of the well known types of manure spreaders.

In Fig. 4 I have shown a form of construction of my device in which the blades have the same width and pitch and bear the same relation in radial distance from the axis of the device as in the preferred form illustrated in Figs. 1 and 2, and from which the core shown in the illustration of my preferred construction is omitted. Therein collars 24 formed with straps 25 and secured to the shaft $15^a$ supply the supporting means for the blades, and thereby accomplish a lighter construction.

While the preferred embodiment of my invention has been described herein with considerable particularity, I do not intend to be limited in the interpretation of the following claims to the details of construction set forth, except as may be necessitated by the prior art.

I claim as my invention:

1. In a spreader mechanism, a load-distributing device comprising a rotating spiral blade formed with progressively varied pitch and peripheral diameters, and having a rotating conical core.

2. In a spreader having a load containing body and a discharging beater at one end thereof, a wide spread rotating distributor adapted to receive the load from said discharging beater and comprising right and left diverging spiral blades, and a central core of varying diameters having its least diameter at the center and progressively increasing in diameter toward its ends.

In testimony whereof, I have hereunto set my hand.

JOHN C. BOHMKER.